Patented Feb. 26, 1929.

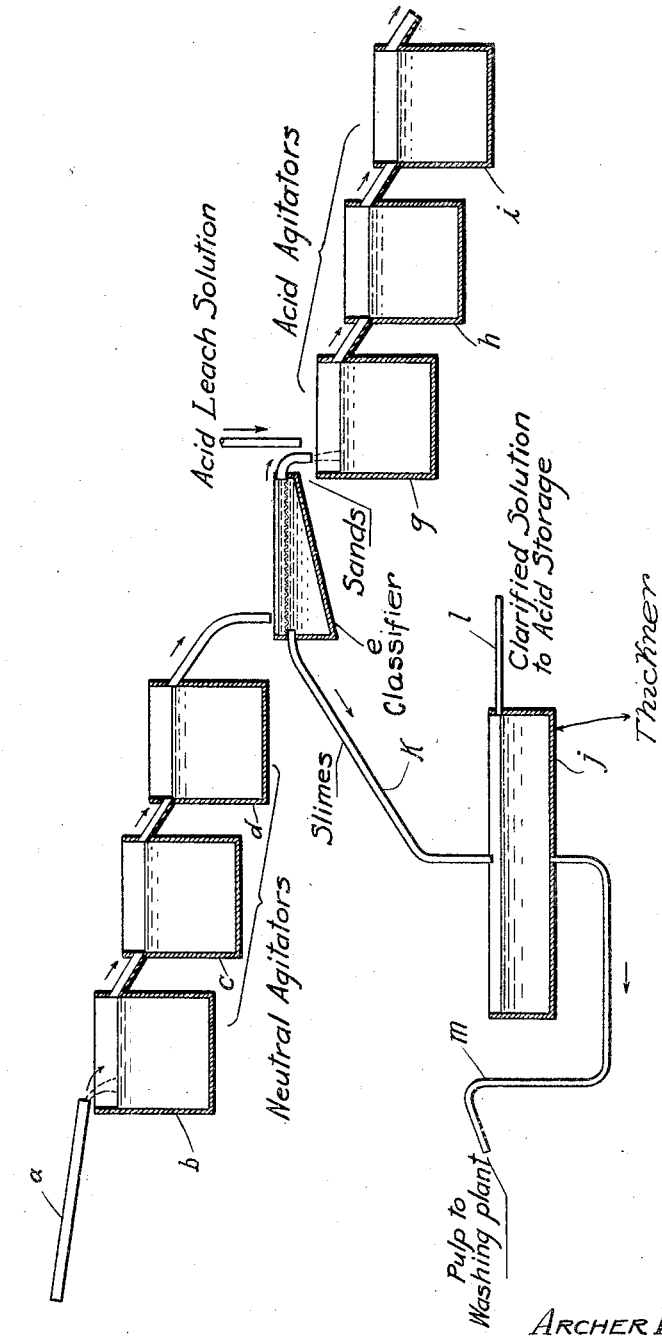

1,703,435

UNITED STATES PATENT OFFICE.

ARCHER E. WHEELER, OF SCARSDALE, NEW YORK.

PROCESS FOR THE PURIFICATION OF LEACHING SOLUTIONS AND THE RECOVERY OF ACIDS OR DISSOLVING AGENTS.

Application filed November 17, 1923. Serial No. 675,285.

This invention relates to improvements in the method of purifying leaching solutions and the recovery of acids or dissolving agents for reuse in leaching out the desired constituents from finely comminuted ore.

In any commercial leaching process, the dissolving agent, besides taking into solution the valuable soluble constituent in the ore or material being treated, also dissolves varying amounts of other constituents which are of no value to the operator. These may be referred to as impurities. These impurities gradually accumulate in the solution unless an effort is made to remove them and may finally result in a foul solution, in which the impurities hinder the recovery of the desired valuable element.

For example, in the leaching of copper ores by sulphuric acid, the acid not only takes copper into solution, but also varying amounts of lime, magnesia, iron, alumina, etc. The accumulation of these impurities may cause trouble. For example, the presence of iron in a solution which is being electrolyzed to recover the copper, has a tremendous detrimental affect on ampere efficiency. In fact there is a point of iron content at which ampere efficiency would drop almost to zero. Again, the presence of large quantities of alumina has a marked effect on the dissolving power of a leaching solution, and too large quantities of this element will result in low copper extractions. To operate efficiently care must be taken to rid the solution of the accumulation of those impurities which cause trouble. One common though wasteful prior method is to discard enough solution from time to time or continuously, to remove from the solution the input of objectionable impurities.

When an acid solution containing considerable quantities of the impurities, such as iron and alumina, is neutralized by further additions of ore and agitated for a sufficient length of time, the iron and alumina are precipitated to a greater or less extent. Attempts have been made to utilize this fact to purify leaching solutions, but a successful method so far as I am aware has never heretofore been developed. Precipitation has been effected, but at the expense of a loss of copper in the excess ore necessary to be added to cause the reaction to proceed, and the precipitated iron and alumina were not prevented from going back into solution in some further step in the process.

My improved process overcomes practical difficulties heretofore encountered and enables me to effectively and economically purify leaching solutions without loss of the copper or other desired constituent in the excess ore which is added in carrying out the process and also enables me to recover the acid or other desired agent for immediate reuse in dissolving the required constituent from the ore.

In carrying out my method, I add an excess of comminuted ore to the acid impurity-laden solution and agitate this mixture so as to precipitate the iron, aluminum salts and other impurities.

I then separate the finer particles of ore together with the iron and alumina from the coarser particles of ore before subjecting the ore to any further treatment which would dissolve out the required constituent. When a given ore of copper is treated or leached, the solution of the finer particles is very much faster than it is out of the coarser particles; hence, the greater proportion of the required or valuable constituent of the ore is in the larger particles which have been separated from the smaller particles and impurities.

There is also another method of carrying out my process, in which the ore is added to neutralize the solution and precipitate the impurities, is all or substantially all, coarser than the precipitate or precipitated particles of impurities. In this case the classification following the neutralizing agitation results in the separation of the precipitated impurities alone, or these impurities mixed with only a small amount of fine ore or precipitating material from the coarser particles of the ore or precipitating material.

An example of my method is described below with reference to the accompanying diagrammatic drawing forming part of this specification.

Referring to the drawing, $a$ represents a feed launder in which the acid impurity-laden solution, mixed with an excess of the ore, is fed through a series of agitators, $b$, $c$ and $d$. These agitators are of sufficient volume to give a time of agitation necessary to produce the required precipitation. The discharge from the agitator $d$ goes to classifier $e$. This discharge consists of a neutral solution containing as solids in suspension, ore which has only partly been depleted of its copper content, and also a precipitate of iron and aluminum salts, and any other impurities which will precipitate under these conditions. The classifier *e* is set to deliver a sand product of say, plus 100 mesh to the agitator *g*.

When a given ore of copper is dissolved, the solution of the copper out of the finer particles of ore is very much faster than it is out of the coarser particles. For this reason, the greatest part of the excess copper which was fed to the agitators *b*, *c* and *d* will be found in the coarser sand discharged from the classifier *e* and this sand discharge is delivered to a series of acid agitators *g*, *h* and *i* in which the remaining copper is entirely removed.

All the fine particles of ore from which the copper has been removed and along with them the flocculent precipitate of iron and aluminum and other salts are carried over in the overflow *k* of the classifier and are delivered to a thickener *j*, or other means of separating the solids from the liquid. The clear neutral solution is returned to the system by a pipe *l* and the solids are pumped from the bottom of the tank through a pipe *m* and washed in a suitable washing apparatus. This solid contains fine barren ore and the precipitated iron and alumina and other precipitated salts.

It is clear that any impurities which are taken into solution serve as consumers of acid which on discharging the solution as heretofore done means a direct loss of acid and therefore resulting high costs.

The precipitation of the iron and alumina, and perhaps of some other salts, results in the release of all or a part of the acid or dissolving agent which was in combination with the iron and alumina. This released acid or dissolving agent immediately dissolves copper from the ore, thus recovering a part of the acid or dissolving agent which would otherwise be lost or discarded.

Thus my method accomplishes the elimination of iron and alumina from the original solution without losing the copper which it was necessary to add in excess to produce the given reaction; removes the precipitated impurities from the solution without giving them a chance to be redissolved and recovers for reuse part of the acid or dissolving agent which in prior methods would be lost.

While in the above described example of my process I have set forth that the iron, alumina or other impurities are precipitated by adding an excess of ore, it is to be understood that I may bring about this action by bringing the solution to such a condition either chemically or physically, or both chemically and physically that the desired precipitation takes place. Instead of using ore, I may use any other suitable substance or substances containing different size particles in which case I will separate the precipitate and the finer particles of the precipitating agent from the coarser particles before any further operation is performed which will redissolve the precipitate.

While I have described with great particularity the treatment of a specific ore with the use of a specific acid or dissolving agent and have recited the steps in my process in a definite sequence, it is to be understood that I am not limited thereto and that the description and drawings are to be construed in an illustrative rather than limiting sense.

What I claim is:—

1. In the purification of leaching solutions, the method which includes the steps of adding a mass of particles of different sizes to neutralize the solution and to precipitate the impurities and separating the precipitate and finer particles from the coarser particles.

2. In the purification of leaching solutions, the method which includes adding a mass of ore particles approximately the same size but all larger than the precipitated particles of impurities, and separating the precipitated particles from the coarser ore particles which contain soluble constituents and subjecting the coarser ore particles to further treatment.

3. In the purification of leaching solutions used in the treatment to recover the valuable constituent from ores containing iron and alumina, the method which includes the steps of adding an excess of ore particles of different sizes to neutralize the solution and cause the precipitation of iron, alumina and other impurities, and separating the said precipitate and finer particles of ore from the coarser particles before subjecting the mixture to any treatment which would redissolve the precipitated impurities.

4. In the recovery and purification of leaching solutions used in the treatment of ores containing iron and alumina the method which consists of adding an excess of ore to the solution to render it neutral, agitating the mixture or otherwise bringing the solution and ore or other precipitant into intimate contact to precipitate the iron and alumina and other impurities, subjecting the whole to the sizing operation to physically separate the precipitated iron and alumina and other impurities from the coarser particles, discharging the precipitated iron and alumina and other impurities, and then subjecting the coarser particles to further treatment.

5. In the recovery and purification of leaching solutions or dissolving agents used in the treatment of ore containing iron and alumina, the method which consists of adding an excess of ore to the solution to render it neutral, bringing the solution and ore into intimate contact to precipitate the iron and alumina and other impurities, discharging the precipitated iron and alumina together with the finer particles and clarifying the solution and returning it to the system for reuse and discharging the coarse particles to a receptacle for further treatment.

6. In the recovery and purification of leaching solutions or dissolving agents used in the treatment of ores containing iron and alumina, the method which includes the steps of adding an excess of ore particles of different sizes to bring the solution to such condition that iron, alumina and other impurities are precipitated, and then separating said precipitated impurities and the finer particles of the precipitating agent from the coarser particles before subjecting the mass to any treatment which would redissolve the precipitate and subsequently treating the coarser particles to recover the desired constituents.

7. In the purification of leaching solutions the method which includes adding a mass of particles of different sizes but all or substantially all of larger size than the precipitated particles of impurities, and separating the precipitated particles from the coarser particles which contain soluble constituents and subjecting the coarser particles to further treatment.

In witness whereof, I have hereunto signed my name.

ARCHER E. WHEELER.